United States Patent
Meszaros

(10) Patent No.: US 8,568,070 B2
(45) Date of Patent: Oct. 29, 2013

(54) CARGO LASHING FITTING

(75) Inventor: Lajos Meszaros, Huntington, NY (US)

(73) Assignee: Peck & Hale, L.L.C., West Sayville, NY (US)

(*) Notice: Subject to any disclaimer, the term of this patent is extended or adjusted under 35 U.S.C. 154(b) by 0 days.

(21) Appl. No.: 13/286,819

(22) Filed: Nov. 1, 2011

(65) Prior Publication Data

US 2012/0107067 A1   May 3, 2012

Related U.S. Application Data

(60) Provisional application No. 61/408,816, filed on Nov. 1, 2010.

(51) Int. Cl.
*B61D 45/00* (2006.01)

(52) U.S. Cl.
USPC .......................................................... 410/101

(58) Field of Classification Search
USPC ..................... 410/101, 106, 109, 112, 114
See application file for complete search history.

(56) References Cited

U.S. PATENT DOCUMENTS

| | | | | |
|---|---|---|---|---|
| 2,843,060 A * | 7/1958 | Sladek | ........................... | 410/112 |
| 2,952,946 A * | 9/1960 | Lucas | ............................ | 52/707 |
| 2,962,245 A * | 11/1960 | Molzan et al. | ................. | 244/115 |
| 3,233,319 A * | 2/1966 | Jensen et al. | ..................... | 29/437 |
| 3,556,457 A | 1/1971 | Patnaude | | |
| 3,647,172 A | 3/1972 | Van Der Molen | | |
| 3,776,169 A | 12/1973 | Strecker | | |
| 3,860,209 A * | 1/1975 | Strecker | ......................... | 410/116 |
| 3,888,190 A * | 6/1975 | Bigge | ............................ | 410/101 |
| 3,927,623 A | 12/1975 | Caron | | |
| 3,973,684 A | 8/1976 | Di Martino | | |
| 4,091,744 A * | 5/1978 | Crissy et al. | ................... | 410/116 |
| 4,096,816 A | 6/1978 | Patterson, III et al. | | |
| 4,400,856 A * | 8/1983 | Tseng | ........................... | 24/590.1 |
| 4,457,650 A * | 7/1984 | Tseng | ........................... | 410/111 |
| 4,645,392 A * | 2/1987 | Takaguchi | ........................ | 410/80 |
| 4,877,361 A * | 10/1989 | DeRosa et al. | ................. | 410/112 |
| 5,823,588 A * | 10/1998 | Morghen | ......................... | 294/89 |
| 6,422,795 B2 | 7/2002 | Holt et al. | | |
| 8,197,166 B2 * | 6/2012 | Stull et al. | ..................... | 410/106 |
| 8,360,385 B2 | 1/2013 | Burg et al. | | |

OTHER PUBLICATIONS

Pacific Marine & Industrial, Helicopter Tie Down Web Pages, Jun. 3, 2010.

* cited by examiner

*Primary Examiner* — H Gutman
(74) *Attorney, Agent, or Firm* — Schroeder Law PC

(57) ABSTRACT

A cargo lashing fitting for affixing to the deck of a transportation vehicle. The fitting includes a housing which is formed from material having welding compatibility with the deck of the transportation vehicle, and is sized to fit within an opening in the deck of such vehicle. The fitting further includes a securing plate removably positioned within the housing and configured to transmit load forces to the housing in a closed loop without such load forces being transmitted into the hardware removably retaining the securing plate within the housing.

20 Claims, 18 Drawing Sheets

Detail A

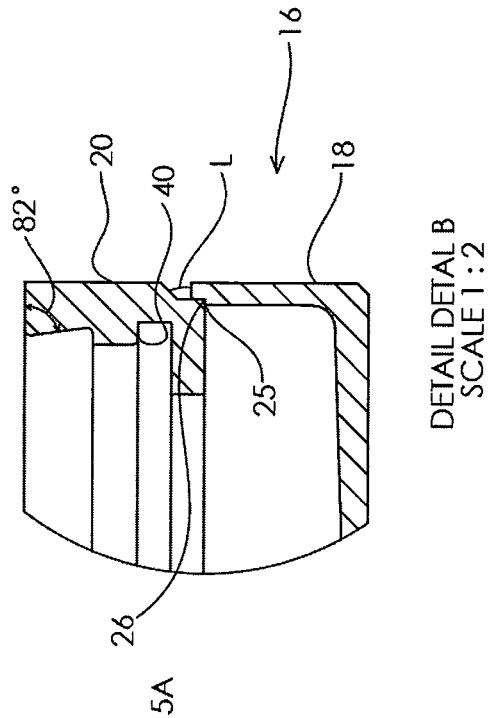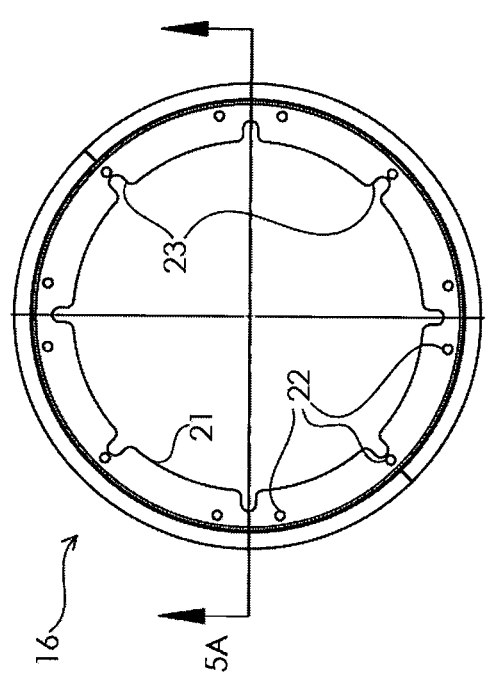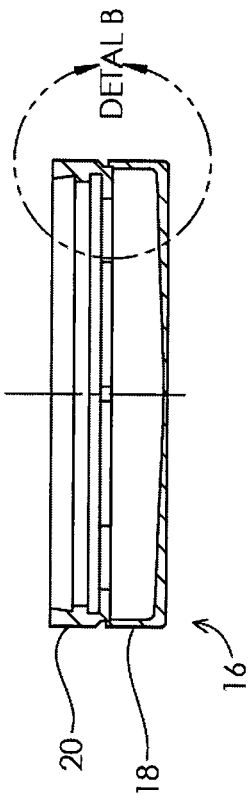

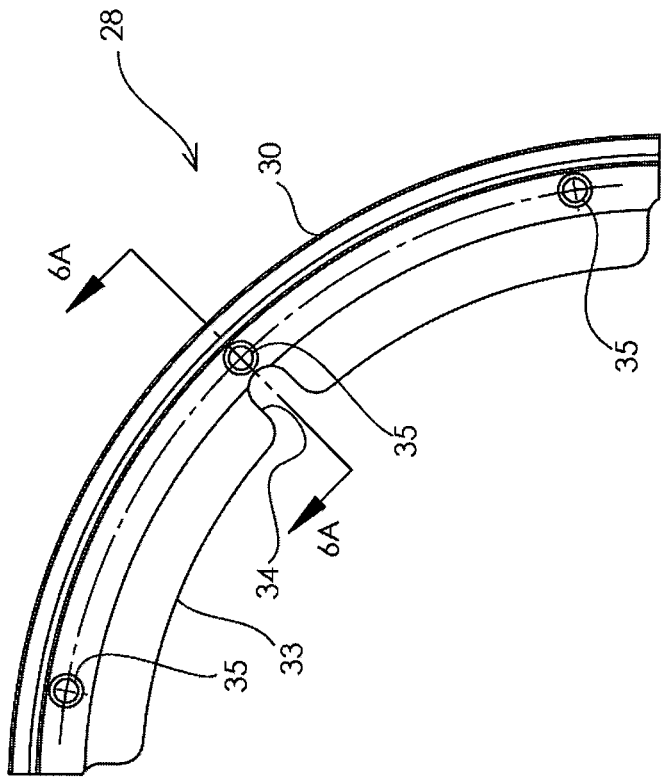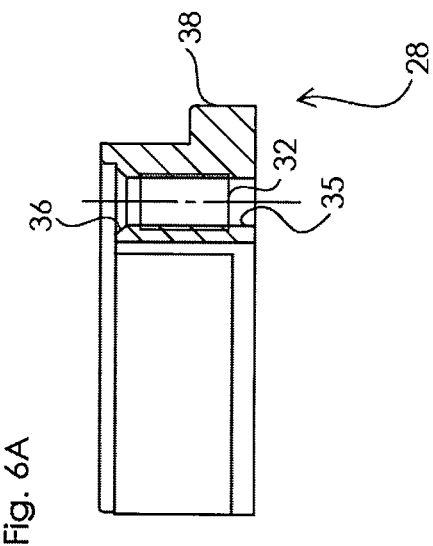

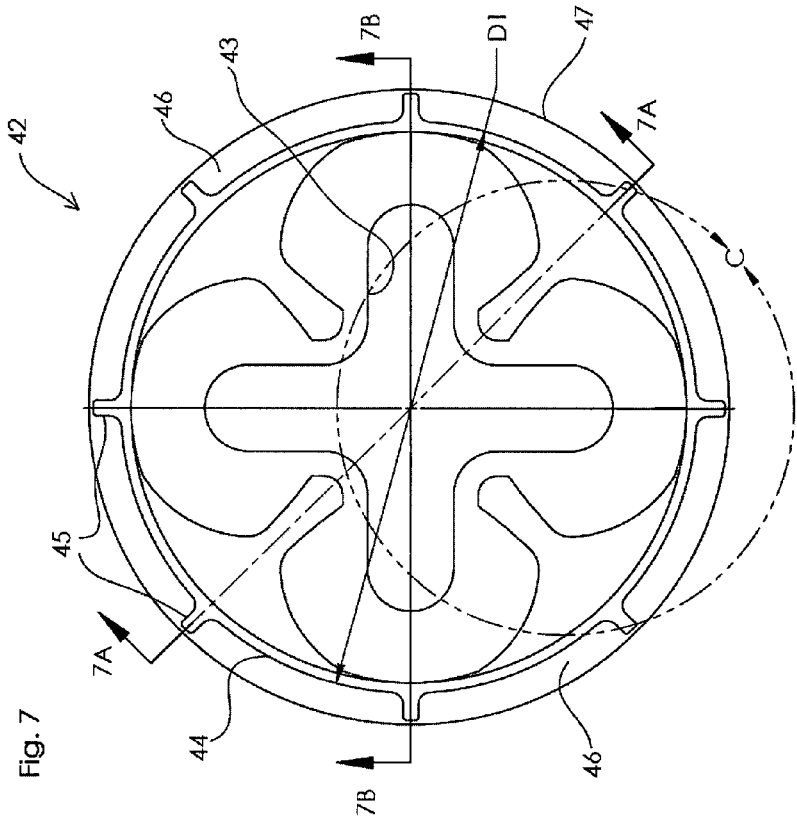
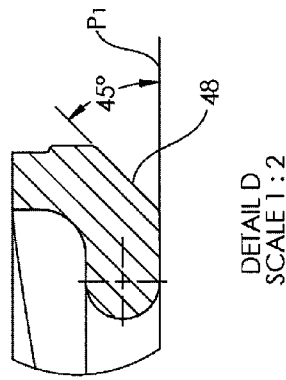
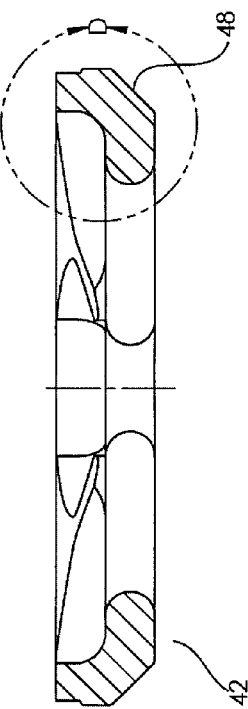

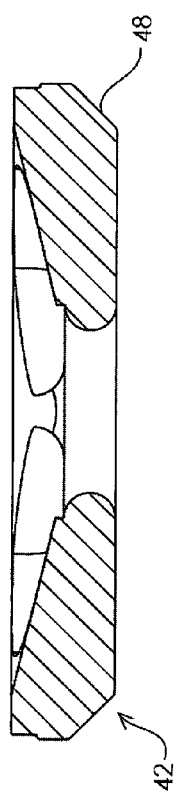
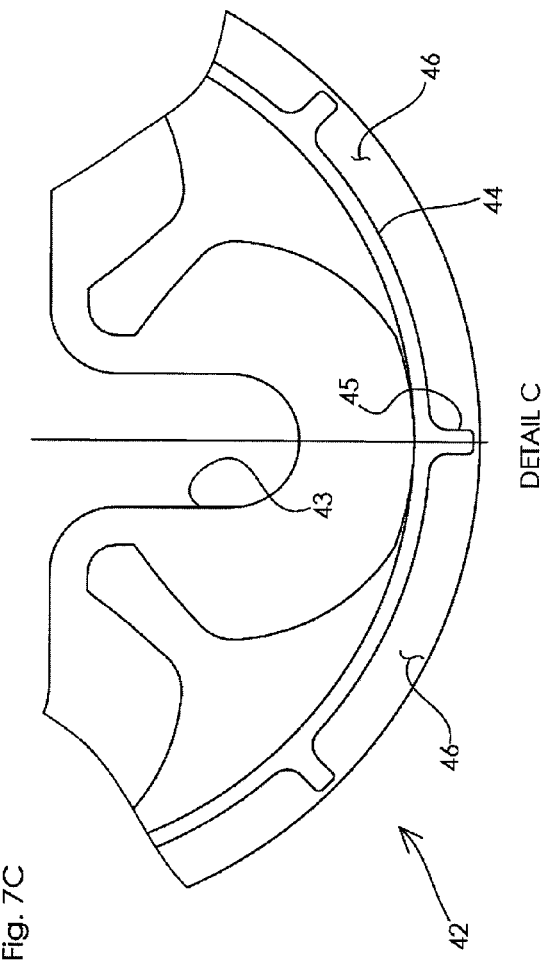

DETAIL E
SCALE 1 : 1

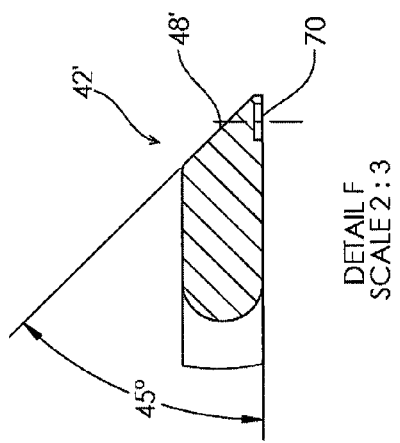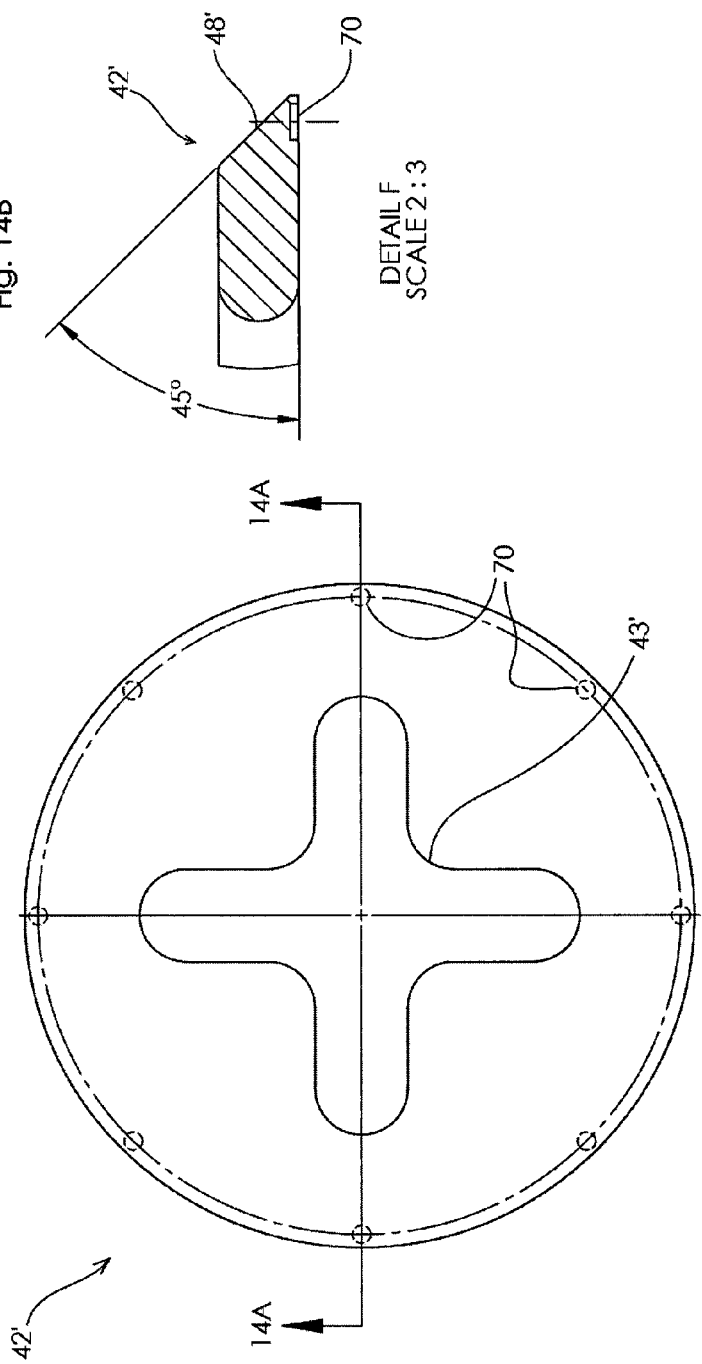

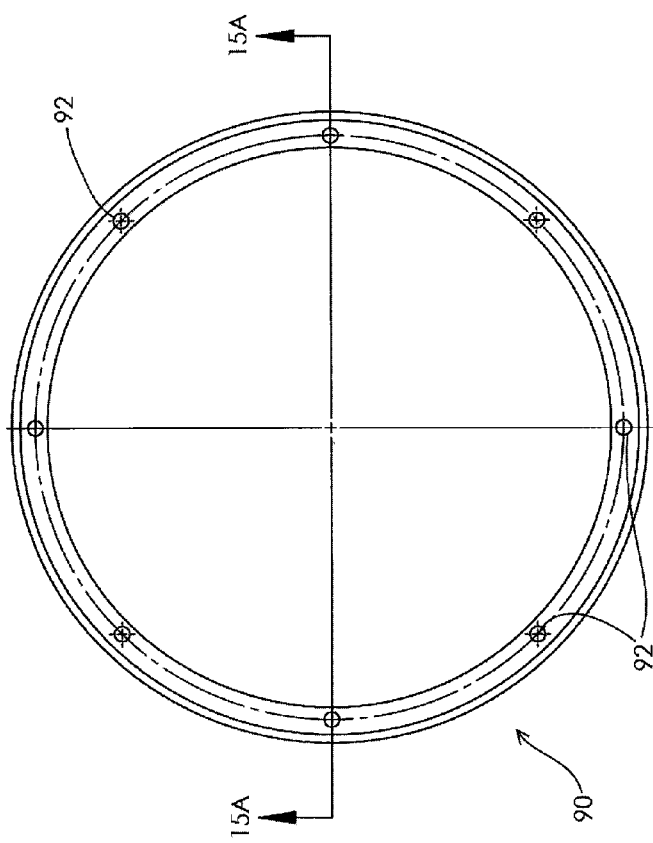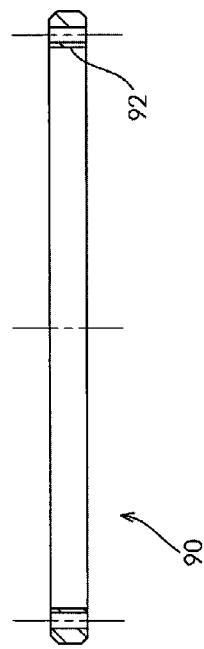
Fig. 15
Fig. 15A

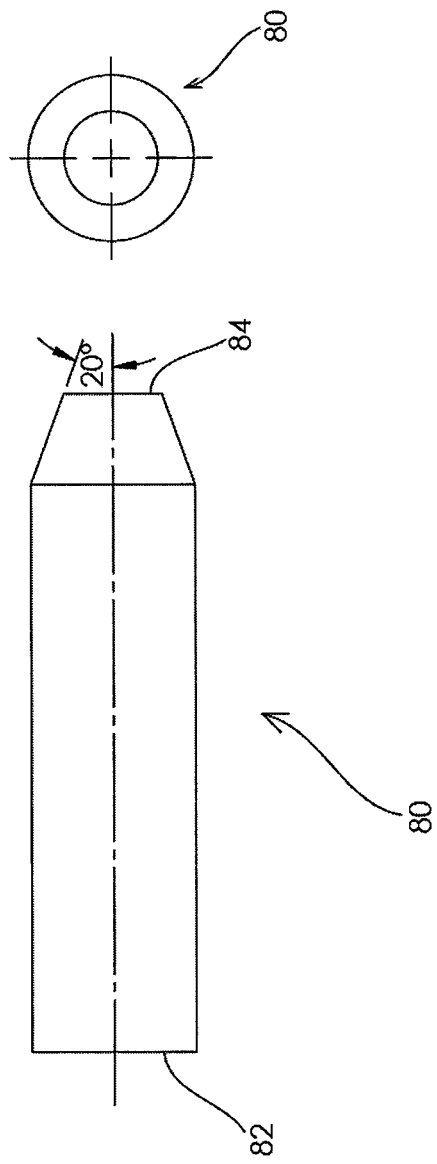

CARGO LASHING FITTING

This application claims the benefit of U.S. Provisional Application Ser. No. 61/408,816 filed Nov. 1, 2010, the disclosures of which is hereby incorporated by reference in their entirety.

BACKGROUND OF THE INVENTION

The present invention relates to transportation of cargo and, more particularly, to cargo lashing fittings affixed to the deck of a transportation vehicle.

In the maritime industry, the transportation of cargo requires securing systems and devices that can support and transfer the very high loads experienced as a result of the ship's dynamics and environmental conditions. Ultimate design loads can reach 70,000 pounds for general cargo securing, and can reach 110,200 pounds for container securing. These high loads often dictate that the cargo lashing fitting affixed to the vessel be made of properly designed and treated steel.

As ships are being designed to be lighter, faster and more economical, aluminum structure is becoming more common, including for large commercial and military vessels. This usage of aluminum makes it difficult to design and install a cargo lashing fitting that will handle and properly transfer loads to the ship's structure. First, the housing of the fitting must be compatible with the aluminum deck of the ship, which generally means that the housing must also be aluminum. Second, aluminum is not an ideal material for the securing plate which interfaces with the lashing gear.

More particularly, lashing gear typically includes steel hooks that can gall an aluminum securing plate. In fact, even steel securing plates are subject to galling over time. One known prior art cargo lashing fitting is referred to as a tri-metallic fitting, and is manufactured using an explosion bonding technique which transitions from a steel securing plate to an aluminum housing through a titanium ring. Thus, the fitting provides a steel securing plate for interfacing with the lashing gear, as well as an aluminum housing for welding compatibility with the deck of the ship. However, as will be recognized by those skilled in the art, explosion bonding is a complicated and expensive process.

In addition, the prior art fittings are typically installed as an integrated unit. This means that if a securing plate is damaged and/or requires maintenance, the entire fitting must be "flame cut" out of the deck of the ship. This is, of course, a time consuming and intricate procedure, which can result in shipping delays and/or increased costs. Finally, there may be applications where the preferred securing plate may vary depending on the nature of the mission. In the past, once a fitting was installed in the deck, it generally remained there until removed by flame cutting.

There is therefore a need in the art for a cargo lashing fitting which provides a simple, cost efficient manner of integrating a securing plate within an aluminum housing. There is a further need in the art for a cargo lashing fitting which allows for removal/replacement of the securing plate without flame cutting of the fitting from the deck.

SUMMARY OF THE INVENTION

The present invention provides a cloverleaf securing plate, made of steel, aluminum, or other compatible matter, that transitions to an aluminum housing assembly. The aluminum housing assembly can be installed to the aluminum structure of a ship. The securing plate is removably secured within the housing in a non-welded manner, and transfers the loads from the lashing gear through the securing plate to the ship's structure in a closed loop fashion. This unique load transfer technique reduces the concentrated structural stress in the fitting and deck, thus eliminating/reducing the need for substantially, thicker and/or larger components. It also allows the securing plate to be readily removed/replaced when desired.

In one preferred embodiment, the present invention provides a cargo lashing fitting for affixing to a deck of a transportation vehicle. The deck includes at least one opening therein. The fitting cooperates with an engagement end of a lashing gear assembly. The fitting includes a housing sized to fit within the opening in the deck. The housing is formed from a material having welding compatibility with the deck. The fitting further includes a securing plate removably positioned within the housing and configured to releasably engage the end of the lashing gear assembly. The securing plate defines a first engagement surface extending around the periphery thereof. The first engagement surface formed an angle A with respect to a first plane extending parallel to the deck. The first engagement surface is located to transmit load forces from the lashing gear assembly to the housing in a closed loop.

As a result, the present invention provides a cargo lashing fitting which transfers the load in a closed loop manner versus the traditional linear load transfers typical in prior art fittings. Moreover, the cargo lashing fitting of the present invention is installed in a new and novel manner, and allows removal of the fitting without flame cutting, which can adversely affect the surrounding ship deck structure. The present design also eliminates the need to create/have access to the underside of the fitting, which is often difficult and/or impossible. Finally, the cargo lashing fitting of the present invention provides a reduced weight fitting. For example, one known traditional steel cargo lashing fitting weighs approximately 40 pounds, while the same sized fitting formed in accordance with the present invention weighs approximately 33.5 pounds.

BRIEF DESCRIPTION OF THE DRAWINGS

FIG. 5 is a plan view of the housing component of the cargo lashing fitting of FIG. 1;

FIG. 5A is a sectional view taken along lines 5A-5A of FIG. 5;

FIG. 5B is an enlarged detail taken from FIG. 5A;

FIG. 6 is a plan view of one of the insert assemblies of the cargo lashing fitting of FIG. 1;

FIG. 6A is a sectional view taken along lines 6A-6A of FIG. 6;

FIG. 7 is a bottom view of the securing plate of the cargo lashing fitting of FIG. 1;

FIG. 7A is a sectional view taken along lines 7A-7A of FIG. 7;

FIG. 7B is a sectional view taken along lines 7B-7B of FIG. 7;

FIG. 7C is an enlarged detail taken from FIG. 7;

FIG. 7D is an enlarged detail taken from FIG. 7B;

FIG. 14 is a plan view of a securing plate of the cargo lashing fitting of FIG. 10;

FIG. 14A is a sectional view taken along lines 14A-14A of FIG. 14;

FIG. 14B is an enlarged detail taken from FIG. 14A;

FIG. 15 is a plan view of the spacer ring of the cargo lashing fitting of FIG. 10;

FIG. 15A is a sectional view taken along lines 15A-15A of FIG. 15; and

FIGS. 16 and 16A are views of the anti-rotation pin of the cargo lashing fitting of FIG. 10.

DETAILED DESCRIPTION OF THE INVENTION

Figure 1:
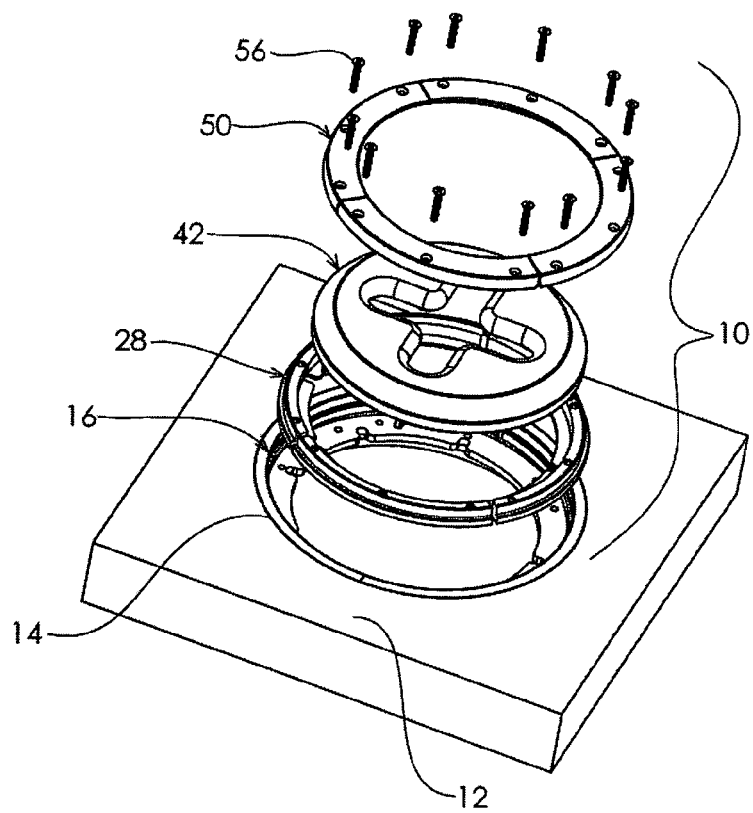
FIG. 1 is an exploded perspective view of a first embodiment of the cargo lashing fitting of the present invention.
Figure 2:
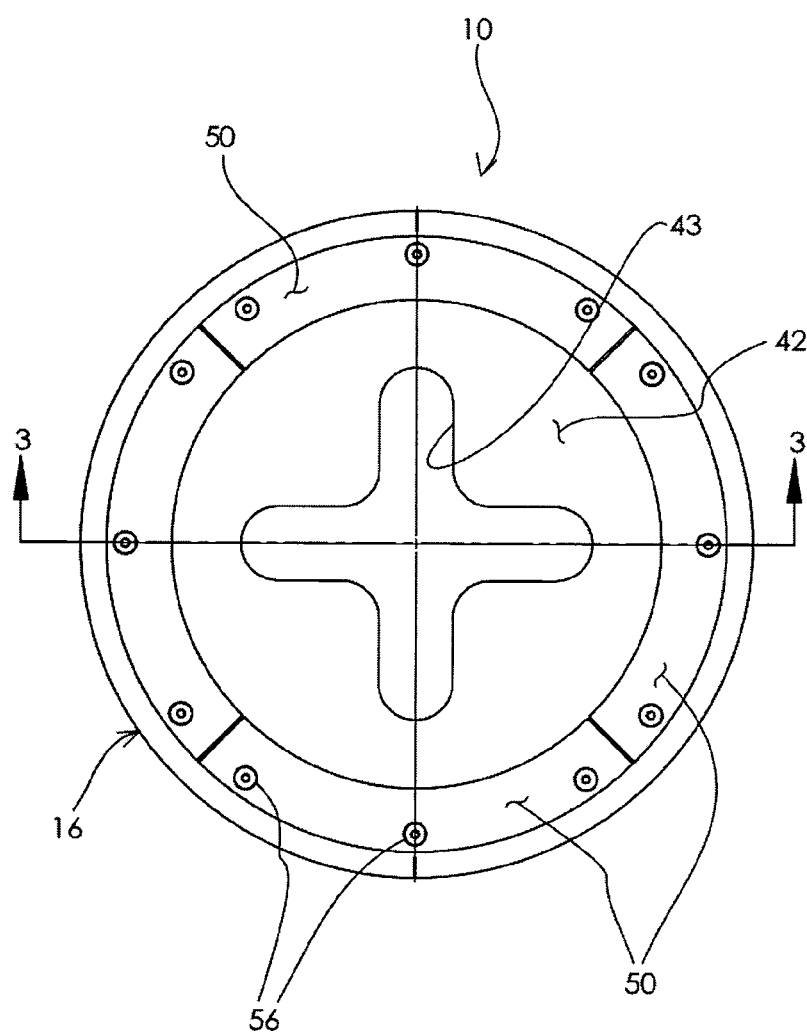
FIG. 2 is a top plan view showing the cargo lashing fitting of FIG. 1 installed within the deck of a vessel.
Figure 3:
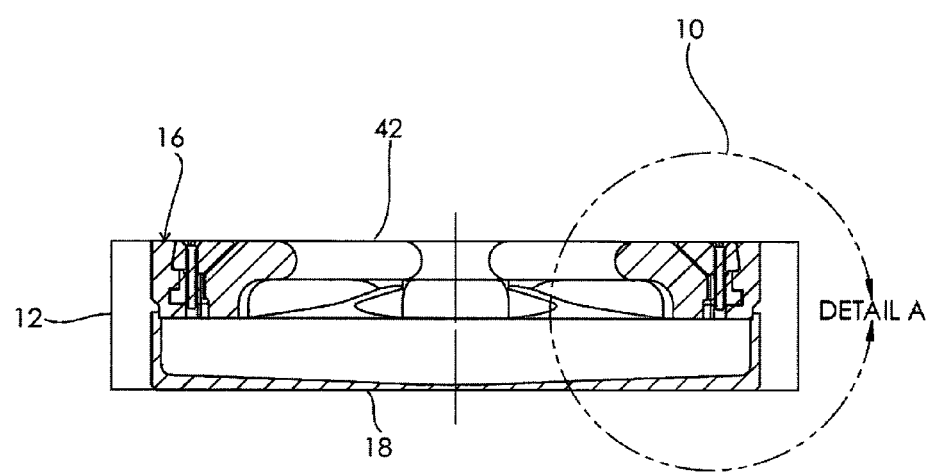
FIG. 3 is a sectional view taken along lines 3-3 of FIG. 2.

Referring to FIGS. 1 to 4, the present invention provides a cargo lashing fitting, namely fitting assembly 10, for installation within the deck 12 of a vessel, e.g., a commercial ship, a military ship, etc. As explained further hereinbelow, fitting assembly 10 is particularly suited for installation within a deck formed of aluminum (e.g., an aluminum alloy) and/or having a honeycomb construction. The deck 12 is preferably provided with a circular opening 14 sized to accommodate fitting assembly 10. Opening 14 is preferably provided during the manufacture of deck 12 (which is typically formed in discrete sections), and prior to installation of the deck within the vessel. Of course, an opening 14 can be cut into an existing deck of a vessel, if required.

As best seen in FIGS. 5 to 5B, fitting assembly 10 includes a housing 16, which may be assembled from two separately formed components, namely can 18 and ring 20. The housing components are preferably formed of aluminum alloy (or other suitable material), which provides compatibility with the material used to form deck 12. In one preferred embodiment, both housing 16 and deck 12 are formed of aluminum alloy. In addition to reducing the weight of housing 16, the usage of aluminum allows housing 16 to be welded to deck 12. In another preferred embodiment, ring 20 includes circumferentially-extending shelf 21 having a plurality of apertures 22 located thereabout. Shelf 21 also includes a plurality of notches 23 located thereabout.

Can 18 and ring 20 are inserted into opening 14, and thereafter welded to deck 12. It is contemplated herein that housing 16 can be preassembled prior to installation within the deck, or that the individual can 18 and ring 20 components can be installed in place one at a time. Individual installation of the components can provide the installer with a degree of flexibility to address any tolerance issues with the deck and/or to ensure that the socket assembly is properly aligned with the upper surface 24 of deck 14. In one preferred embodiment, can 18 and ring 20 are formed of 6061-T6 aluminum alloy.

The assembly of can 18 and ring 20 is shown in detail apart from deck 14 in FIGS. 5 to 5B. Can 18 is preferably provided with a ledge 25, which receives and supports a lower edge 26 of ring 20. Thus, ring 20 is sized to sit within and be supported by can 18. In one preferred embodiment, ring 20 is welded to can 18 at location L. As mentioned, this welding can occur prior to or during installation of the housing within the deck of the vessel. It is also contemplated herein that housing 16 can be formed as a single integral component. This may be accomplished through various manufacturing methods, including a forgoing/machinery combination. The formation of housing 16 as a single component may provide cost savings by eliminating manufacturing steps, including the step of welding the individual components. It may also provide a housing having better tolerance. In all other respects, the one-component housing is similar to the two-component housing shown in FIGS. 5 to 5B.

As it will explained further hereinbelow, the remaining components of fitting assembly 10 can be assembled/disassembled without welding and/or disruption to the structure of the vessel. As a result, it is contemplated herein that housing 16 can be installed during the manufacture of the individual deck components. In other words, housing 16 can be welded into the deck structure at the place of manufacture, and prior to installation of the deck onto the vessel. It will be recognized that the ability to reduce welding "in the field" saves time and expense during the ship construction process, and also results in more uniform and controlled installation of the housing within the deck.

Figure 6B:
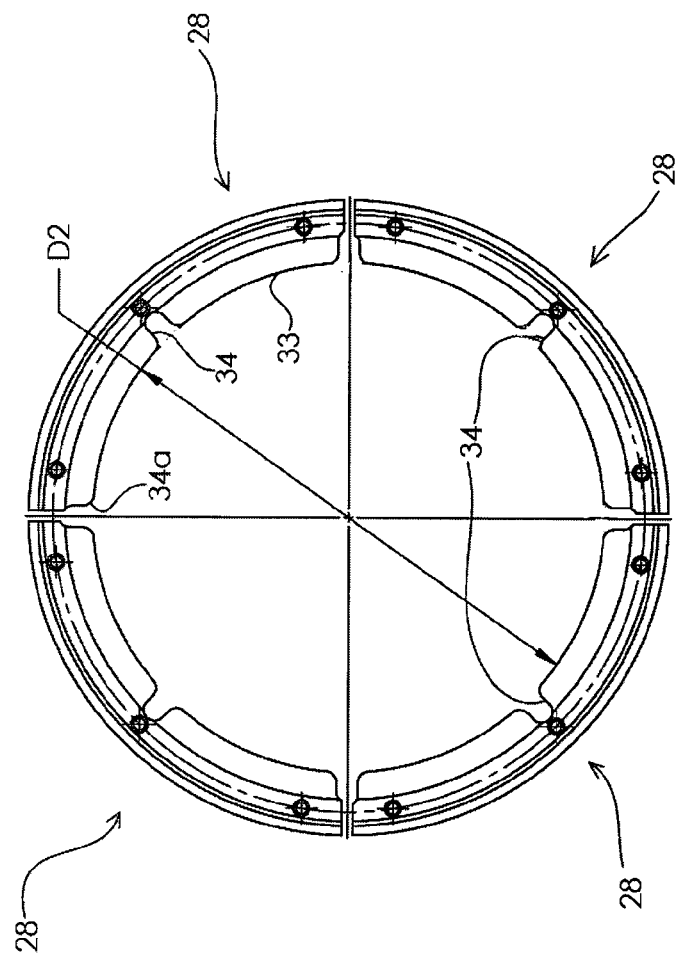
FIG. 6B is a plan view showing four insert assemblies arranged in an installation pattern.

Fitting assembly 10 further includes a plurality of insert assemblies 28, preferably four in total. As best seen in FIGS. 6 to 6B, insert assembly 28 includes an arcuate body portion 30 and a plurality of helicoils 32. Each of body portions 30 has an angular arc of approximately 90°, and preferably less than 90° such that a total of four body portions 30 define a 360° circle, leaving slight gaps between the individual portions (which facilitate assembly of the pieces). Each of body portions 30 preferably includes a plurality of legs 33 defining a plurality of notches 34 therebetween. Each of body portions 30 further includes a plurality of apertures 35 extending therethrough. In one preferred embodiment, apertures 35 may include a chamfered surface 36. In another preferred embodiment, a helicoil 32 is inserted within aperture 35 to subsequently receive a threaded device, e.g., a screw. Alternatively, apertures 35 could be tapped to receive a threaded screw.

Figure 4:
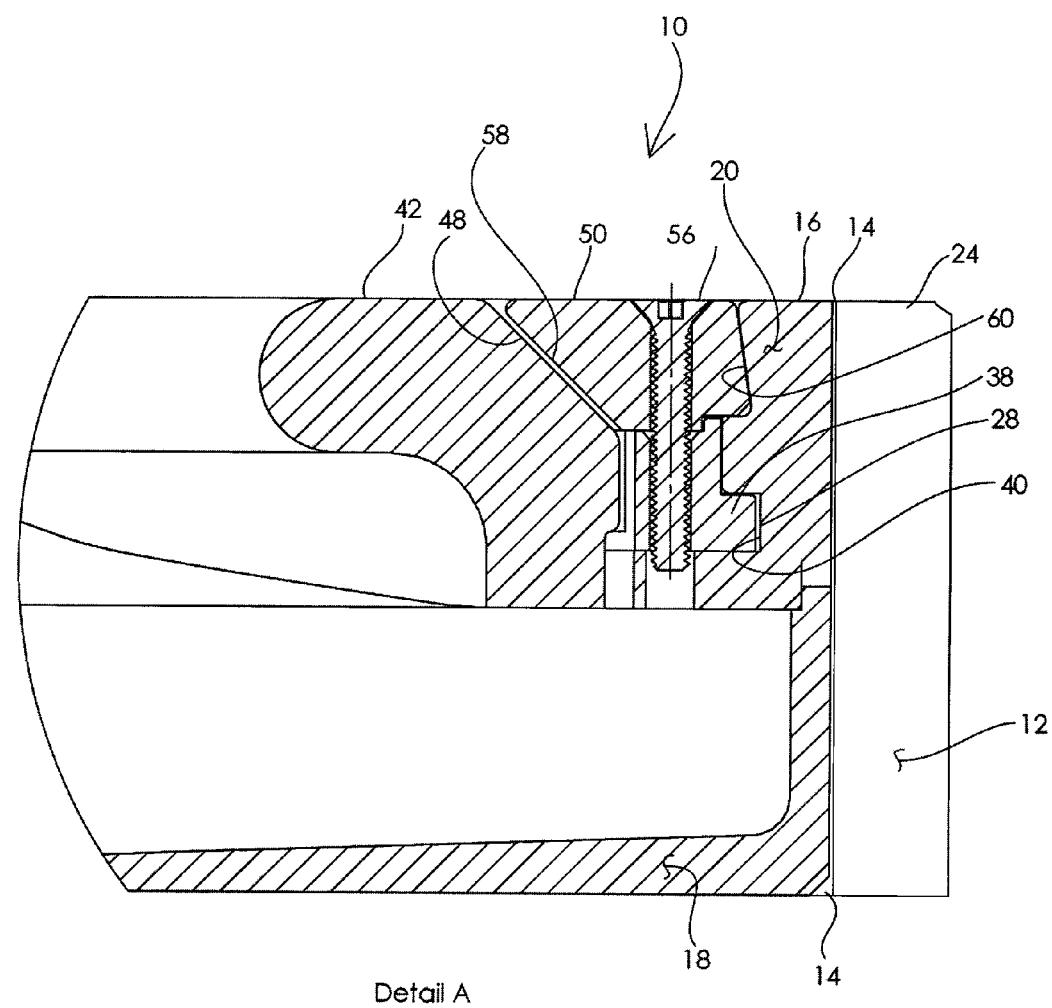
FIG. 4 is an enlarged detail taken from FIG. 3

As best shown in FIG. 4, each of body portions 30 includes a shoulder 38 sized to be received within groove 40 formed in ring 20. More particularly, the individual insert assemblies 28 are located within housing 16 and circularly spaced thereabout, such that four of such assemblies surround the interior of housing 16—preferably leaving a slight gap between each adjoining assembly for ease of installation and tolerance purposes. This gap also creates and defines a notch 34a between adjacent body portions 30 (as seen in FIG. 6B). The design of four individual insert assemblies allows leg 38 to be inserted into groove 40. The individual insert assemblies rest upon shelf 21 of ring 20, and are preferably aligned such that notches 34 and apertures 35 of insert assemblies 28 align with notches 23 and apertures 22 of shelf 21, respectively. In one preferred embodiment, body portions 30 are formed from 6061-T6 aluminum alloy.

As shown in detail in FIGS. 7 to 7D, fitting assembly 10 further includes a securing plate, e.g., cloverleaf plate 42. Plate 42 is preferably an integrally formed component, made from a material compatible with the corresponding lashing gear. In one preferred embodiment, plate 42 is formed from steel, aluminum or another suitable material. Although aluminum has not typically been a preferred material for securing plates which are permanently installed within a fitting, the removability/replacement aspect of the securing plates in the present invention allows aluminum to be used as the plate material, if desired. Although the duty cycle of an aluminum plate may be shorter than a steel plate, the ability to quickly change the plate with minimum cost and/or effort makes aluminum a suitable material in many applications.

Plate 42 is preferably provided with a cloverleaf opening 43 for receipt of a standardized lashing hook. As shown in FIG. 7, the underside of plate 42 is preferably provided with a lip 44 and a plurality of fingers 45. Lip 44 preferably extends around the circumference of the fitting, and defines an outer diameter $D_1$, which is less than inner diameter $D_2$ defined by legs 33 of body portions 30. Fingers 45 are sized and located to be received within notches 34 and notches 23. As a result, surface 46 of rim 47 engages and is supported by the upper surfaces of legs 33. Finally, plate 42 preferably includes an engagement surface 48 which extends around the circumference of the fitting, and which, as shown, preferably define a 45° angle with respect to plane $P_1$.

Those skilled in the art will appreciate that a cloverleaf-configured securing plate is a commonly used design. However, one of the inventive features of this invention is the ability to utilize securing plates having different engagement patterns and/or engagement structures. As described herein, because the securing plate is removably insertable within the fitting assembly, and because removal/insertion can be accomplished quickly without any welding requirements, the ability to exchange securing plates for different applications and/or for maintenance purposes is accomplished with the present fitting assembly.

Figure 8:
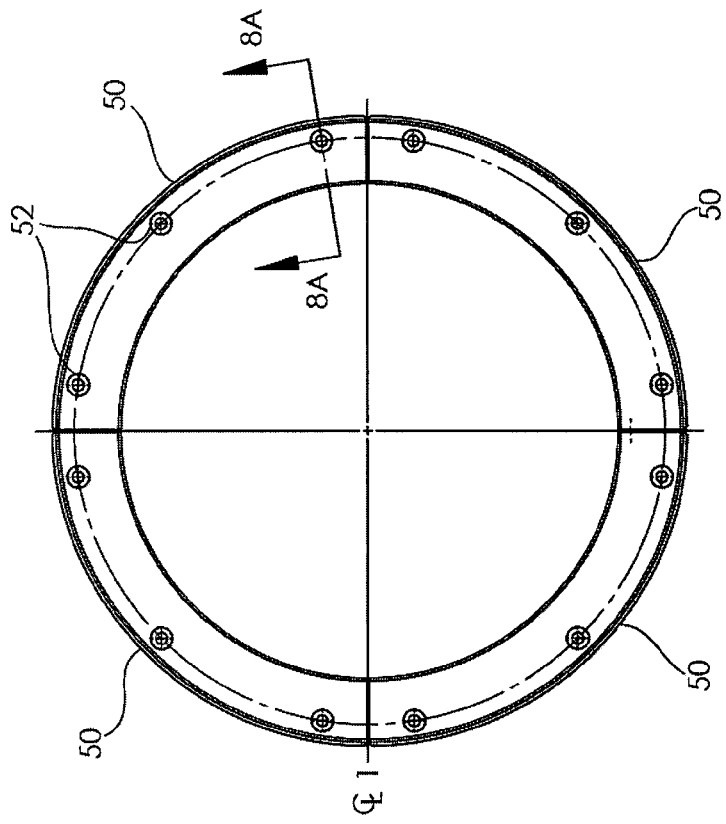
FIG. 8 is a plan view showing four clamping sections arranged in an installation pattern.
Figure 8A:
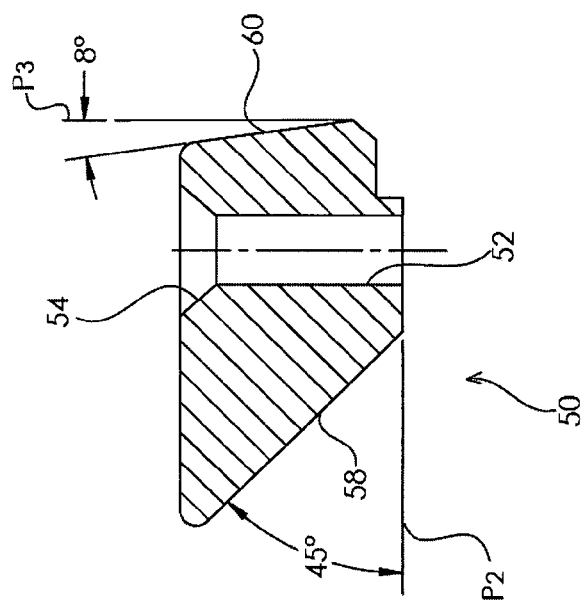
FIG. 8A is a sectional view taken through one of the clamping sections.

Referring now to FIGS. 8 to 8A, fitting assembly 10 further includes a plurality of clamping sections 50, preferably 4, which generally follow the angular orientation of insert assemblies 28. In this regard, each of clamping sections 50 includes a plurality of apertures 52 which are angularly oriented to align with apertures 34 formed in body portions 30. Each of apertures 52 preferably include a chamfered surface 54 to allow flush mounting of the heads of screws 56. Each of clamping sections 50 includes an engagement surface 58 which, as shown, preferably defines a 45° angle with respect to plane $P_2$. Clamping sections 50 further includes engagement surface 60 which defines an angle greater than 0° with respect to plane $P_3$. In one preferred embodiment, the angle defined between engagement surface 60 and plane $P_3$ is approximately 8°. Ring 20 of housing 16 includes a corresponding engagement surface 62, wherein engagement surface 62 forms an angle of less than 90° with respect to surface 24, and preferably forms an angle of approximately 82° with respect to surface 24 (see FIG. 5B). In one preferred embodiment, clamping sections 50 are formed from 6061-T6 aluminum alloy.

Once plate 42 is positioned within the housing, and rested upon legs 33 of insert assemblies 28, clamping sections 50 are positioned in place, and thereafter oriented such that apertures 52 align with apertures 35. Thereafter, a plurality of screws 56 are inserted through apertures 52 until they engage with the helicoils 32 located within body portions 30. The engagement between shoulder 38 and groove 40 allows screws 56 to "snug down" the clamping sections, without pulling insert assemblies 28 out of housing 16.

Figure 9:
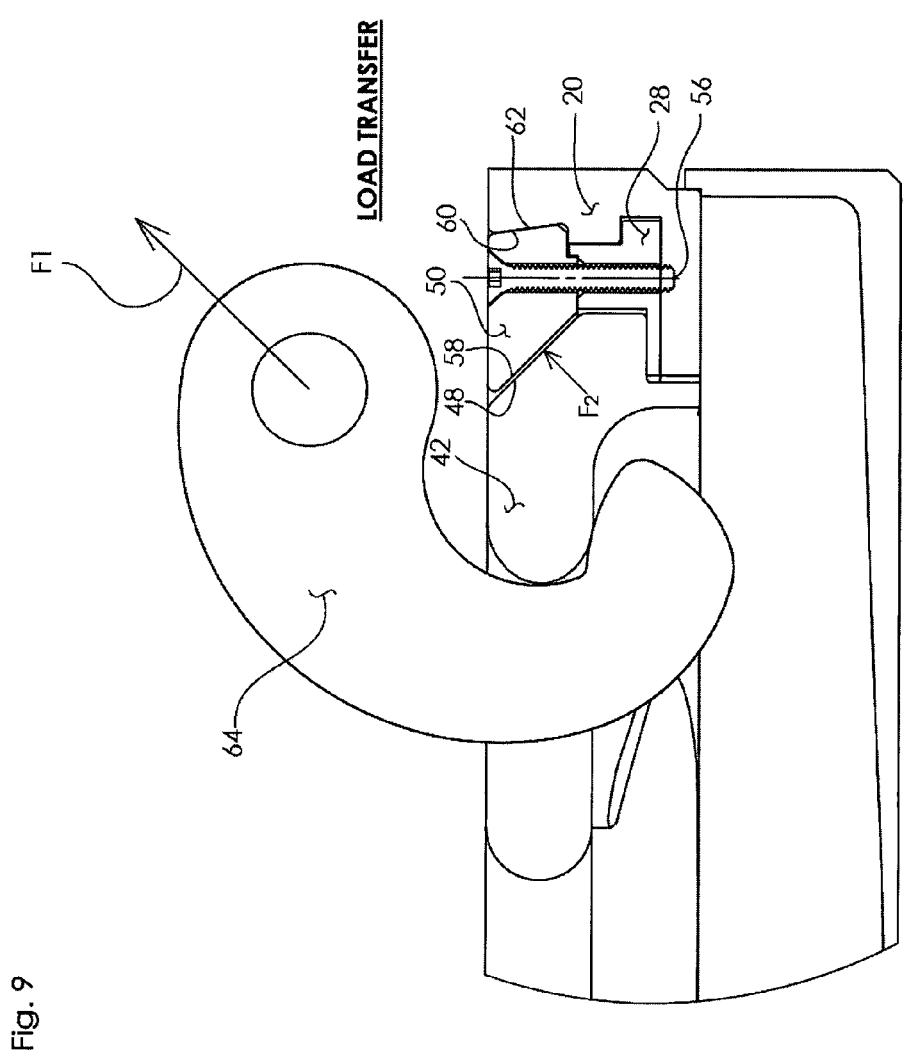
FIG. 9 is a sectional view similar to FIG. 4 illustrating the transfer of force through the cargo lashing fitting.
Figure 10:
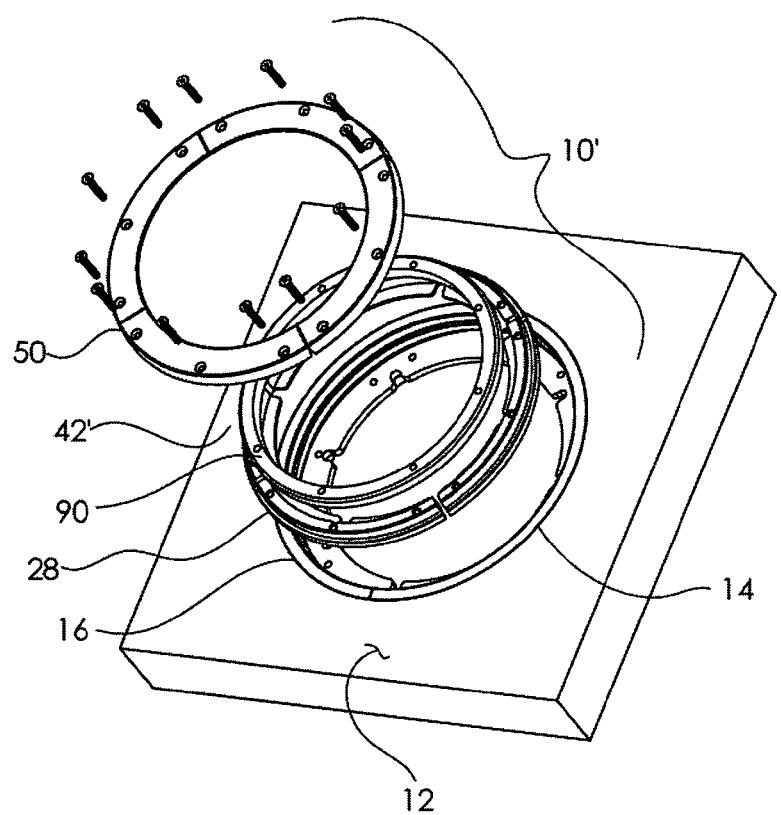
FIG. 10 is an exploded perspective view of a second embodiment of the cargo lashing fitting of the present invention.
Figure 11:
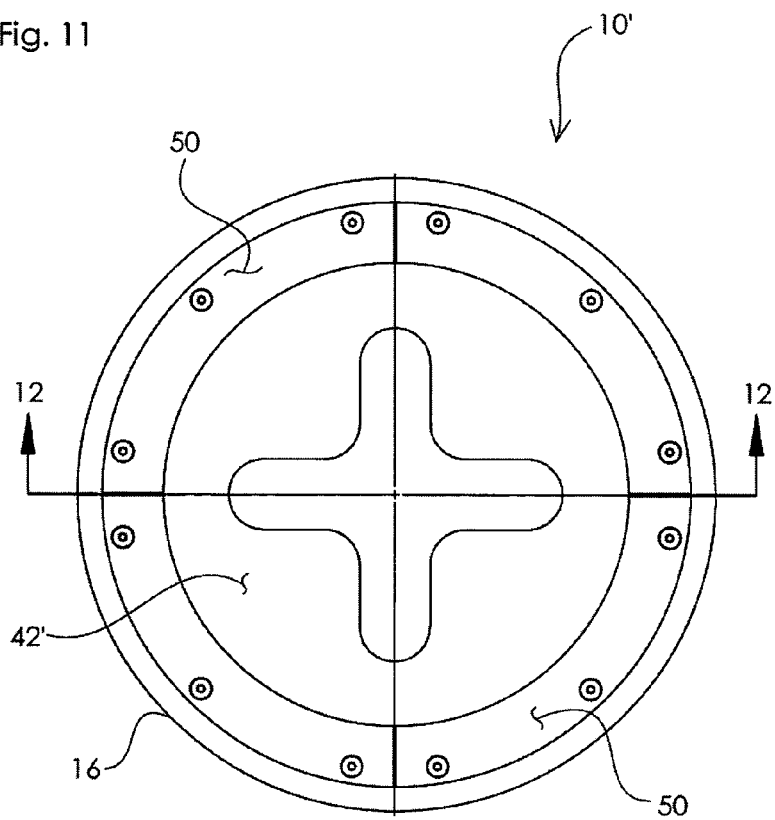
FIG. 11 is a top plan view showing the cargo lashing fitting of FIG. 10 installed within the deck of a vessel.
Figure 12:
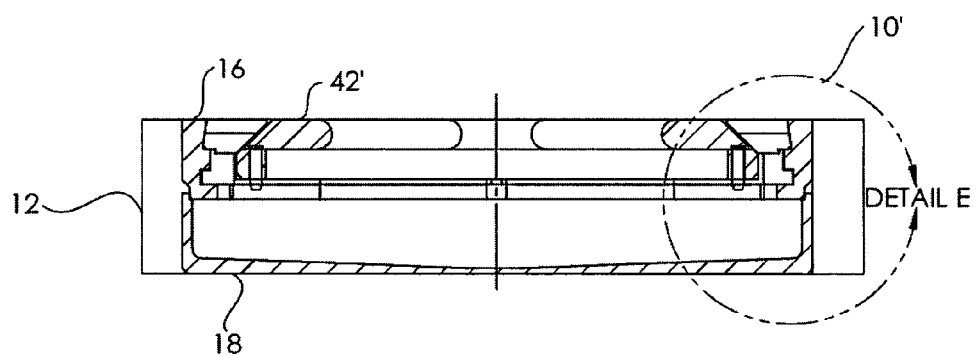
FIG. 12 is a sectional view taking along lines 12-12 of FIG. 11.

Once assembled, cloverleaf plate 42 is available for use for securing cargo. Referring now to FIG. 9, the inventive design of the present invention provides a unique load transfer technique which allows the usage of aluminum components, while also allowing for the assembly/disassembly of the fixture. More particularly, when a hook 64 from a lashing gear (not shown) engages plate 42, the lashing gear provides a pull force $F_1$ as shown. This in turn imparts a compression load $F_2$ into the plate. Compression load $F_2$ is transmitted from engagement surface 48 to engagement surface 58. The force is thereafter transmitted from engagement surface 60 to engagement surface 62 of the housing, which then transfers the force into the deck structure. Force $F_2$ is never transferred to screw 56 or to insert assemblies 28. In fact, the described force would be transmitted in exactly the same way, even if screws 56 were not installed.

It is has been discovered herein that forming engagement surfaces 48 and 58 with the angular orientation described hereinabove provides a configuration whereby clamping section 50 extends radially inward above at least a portion of plate 42 thereby capturing and retaining plate 42 within the housing. However, the same configuration also ensures that the load forces imparted on the plate are transmitted to the clamping section. In turn, the angular orientation between engagement surface 60 and engagement surface 62 allows the load forces to be transmitted into the housing without such forces being transferred to screw 56 or insert assemblies 28, and without plate 42 being pulled out of the housing.

A second embodiment of the present invention, namely fitting assembly 10', is shown in FIGS. 10 to 16A. Fitting assembly 10' is similar in design and function to fitting assembly 10, except as described hereinbelow. The description of the common components will not be repeated herein.

Fitting assembly 10' differs from fitting assembly 10 in that the securing plate, namely plate 42', is formed with a different cross-sectional configuration (see FIGS. 14 to 14B). Although plate 42' includes a cloverleaf opening 43' and an engagement surface 48', the overall height of the plate is reduced. In addition, the fingers 45 included on plate 42 have been removed from plate 42'. These modifications reduce the complexity of the geometry of the plate, which can facilitate the manufacture of plate 42'.

Plate 42' includes a plurality of recesses 70 positioned around the circumference thereof. These recesses are sized and located to receive a plurality of anti-rotation pins 80 (see FIGS. 16 to 16A). Each of pins 80 includes a plate-engaging end 82 and a shelf-engaging end 84. In one preferred embodiment, pins 80 are formed from aluminum, e.g., a 7075-T6 aluminum alloy.

Figure 13:
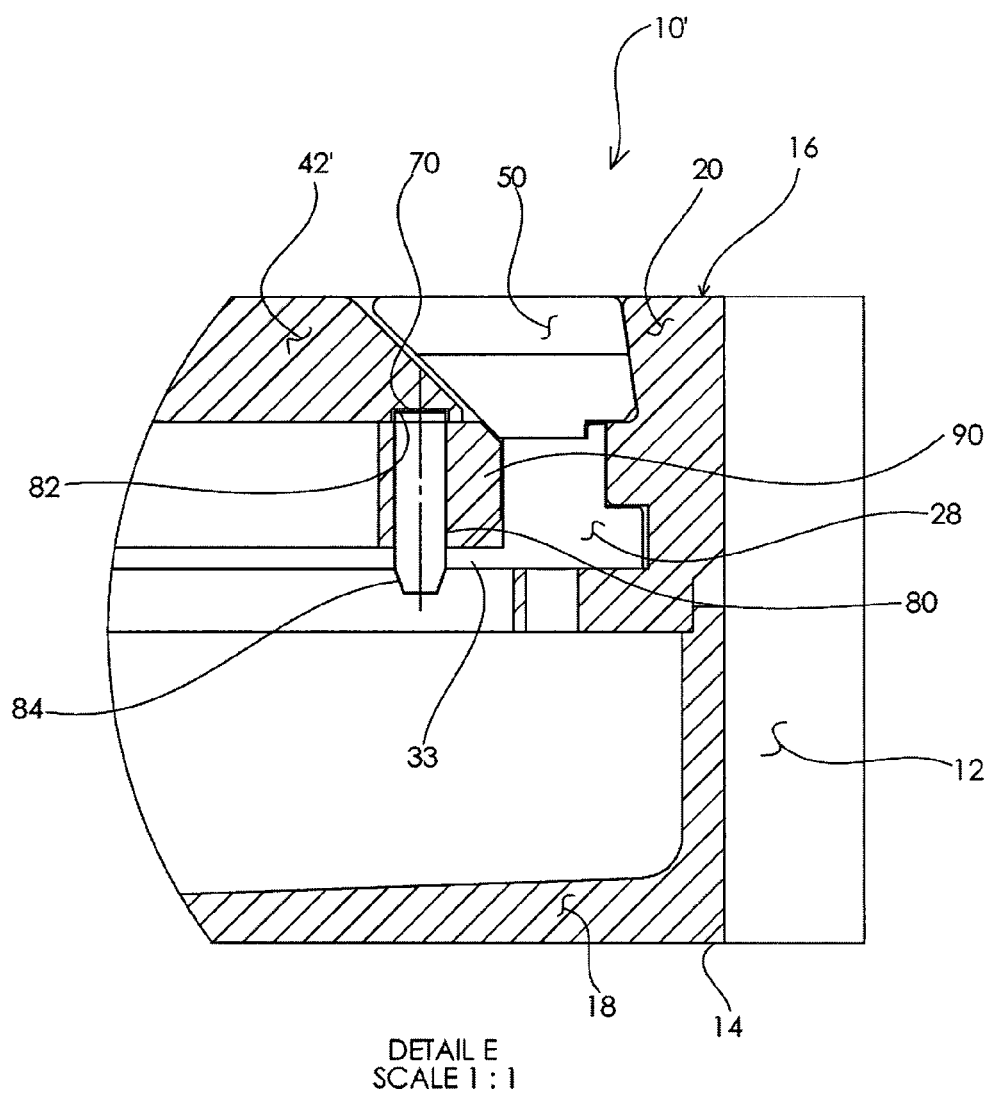
FIG. 13 is an enlarged detail taken from FIG. 12.

Fitting assembly 10' further includes a ring-shaped spacer 90 (see FIGS. 15 to 15A). As best seen in FIG. 13, spacer 90 is supported by legs 33 of insert assemblies 28. Spacer 90 includes a plurality of apertures 92 positioned about the circumference thereof, and located to align with recesses 70. In turn, both recesses 70 and apertures 92 are located to align with notches 34 of insert assemblies 28 and notches 23 of ring 20. In one preferred embodiment, spacing 90 is formed from 6061-T6 aluminum alloy.

To assemble the fitting, insert assemblies 28 are positioned in the housing and oriented such that notches 34 are aligned with notches 23. Spacer 90 is then positioned within the housing such that it is supported upon legs 33, and such that apertures 92 are aligned with notches 34 and 23. Pins 80 are then positioned in each of apertures 92. Plate 42' is thereafter positioned in housing 16 such that is supported by spacer 90, and such that each plate-engaging end 82 of pins 80 engage one of the recesses 70 formed in the bottom of plate 42'. Clamping sections 50 are then installed as described hereinabove.

Once assembled, fitting 10' functions in the same manner as fitting 10. More particularly, forces are transmitted through engagement surface 48' in the same manner as describe hereinabove with respect to engagement surface 48. In one preferred embodiment, fittings 10 and 10' are interchangeable in that plate 42 can be removed from a fitting and replaced with plate 42', spacer 90 and pins 80.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A cargo lashing fitting for affixing to a deck of a transportation vehicle, said deck including at least one opening therein, said fitting cooperating with an engagement end of a lashing gear assembly, said fitting comprising:
    a housing sized to fit within said opening in said deck, said housing being formed from a material having welding compatibility with said deck;
    a securing plate removably positioned within said housing and configured to releasably engage said end of said lashing gear assembly, said securing plate defining a first engagement surface on the periphery thereof, said first engagement surface forming an angle A with respect to a first plane extending parallel to said deck, said first engagement surface located to transmit load forces from said lashing gear assembly to said housing in a closed loop; and
    at least one clamping section for removably retaining said securing plate within said housing, said clamping section being removably attachable to said housing, said clamping section defining a second engagement surface forming an angle B with respect to a second plane extending parallel to said deck said second engagement surface being located to contact said first engagement surface whereby said load forces may be transmitted from said securing plate to said clamping section, said clamping section defining a third engagement surface forming an angle C with respect to a third plane extending perpendicular to said deck, said third engagement surface being located to contact said housing whereby said load forces may be transmitted from said clamping section to said housing in said closed loop.

2. The fitting according to claim 1, further comprising a plurality of fasteners for removably attaching said clamping section to said housing, and wherein said load forces are transmitted from said clamping section to said housing in said closed loop without said load forces being transmitted to said fasteners.

3. The fitting according to claim 1, wherein said angle A is approximately 45 degrees and said angle B is approximately 45 degrees, and wherein said first engagement surface extends around the periphery of said securing plate.

4. The fitting according to claim 3, wherein said angle C is greater than 0 degrees with respect to said third plane.

5. The fitting according to claim 4, wherein said angle C is approximately 8 degrees.

6. The fitting according to claim 1, wherein said housing includes a can and a ring, and wherein said ring includes a circumferentially-extending shelf having a plurality of apertures and notches located thereabout.

7. The fitting according to claim 6, wherein said can and said ring are welded to one another.

8. The fitting according to claim 7, wherein said can includes a ledge for receiving and supporting said ring.

9. The fitting according to claim 6, further comprising a plurality of insert assemblies, each of said insert assemblies including an arcuate body portion and a plurality of helicoils.

10. The fitting according to claim 9, wherein each of said body portions has an angular arc of approximately 90 degrees.

11. The fitting according to claim 9, wherein each of said body portions includes a plurality of legs defining a plurality of notches therebetween, each of said body portions further including a plurality of apertures extending therethrough, said helicoils being positioned within said apertures.

12. The fitting according to claim 11, wherein said ring includes a circumferentially-extending groove, and wherein each of said body portions includes a shoulder sized for receipt within said groove, each of said insert assemblies being positioned upon said shelf of said ring whereby said notches and said apertures of said insert assemblies are aligned with said notches and said apertures formed in said shelf.

13. The fitting according to claim 12, wherein said securing plate includes a circumferentially-extending lip defining an outer diameter $D_1$, and wherein said legs of said body portions define an inner diameter $D_2$, and wherein $D_1$ is less that $D_2$ such that said lip is received within the opening defined by said legs of said body portion.

14. The fitting according to claim 13, wherein said securing plate further includes a plurality of fingers sized and located to be received within said notches of said insert assemblies and said shelf when said securing plate is positioned thereon.

15. The fitting according to claim 14, wherein said securing plate includes a surface for engaging the upper surface of said legs of said insert assemblies.

16. The fitting according to claim 15, wherein said securing plate includes a clover leaf-shaped opening for engagement with said end of said lashing gear.

17. The fitting according to claim 16, wherein said housing is formed from aluminum and said securing plate is formed from steel.

18. The fitting according to claim 12, wherein each of said clamping sections includes a plurality of apertures, and wherein said fasteners are sized to pass through said apertures formed in said clamping sections and engage said helicoils located within said insert assemblies.

19. The fitting according to claim 12, wherein said securing plate includes a plurality of recesses positioned around the circumference thereof; and
    further comprising a ring-shaped spacer sized for placement upon said legs of said insert assemblies, said spacer including a plurality of apertures positioned thereabout and located to align with said recesses formed in said securing plate and to align with said notches formed in said insert assemblies and said shelf.

20. The fitting according to claim 19, further comprising a plurality of anti-rotation pins, each of said pins including a plate-engaging end for engaging said recesses formed in said plate and a shelf-engaging end for engaging said notches formed in said insert assemblies and said shelf whereby said securing plate is angularly fixed at a preselected orientation within said housing.

* * * * *